(12) United States Patent
Hoepfinger et al.

(10) Patent No.: US 8,744,848 B2
(45) Date of Patent: Jun. 3, 2014

(54) METHODS AND SYSTEMS FOR TRAINING DICTATION-BASED SPEECH-TO-TEXT SYSTEMS USING RECORDED SAMPLES

(75) Inventors: Jeffrey Hoepfinger, Superior, CO (US); David Mondragon, Lakewood, CO (US)

(73) Assignee: NVQQ Incorporated, Boulder, CO (US)

( * ) Notice: Subject to any disclaimer, the term of this patent is extended or adjusted under 35 U.S.C. 154(b) by 436 days.

(21) Appl. No.: 13/091,509

(22) Filed: Apr. 21, 2011

(65) Prior Publication Data

US 2011/0264451 A1 Oct. 27, 2011

Related U.S. Application Data

(60) Provisional application No. 61/327,228, filed on Apr. 23, 2010.

(51) Int. Cl.
*G10L 15/00* (2013.01)
(52) U.S. Cl.
USPC .......................... 704/235; 704/258; 704/260
(58) Field of Classification Search
USPC ......................... 704/235, 258, 260
See application file for complete search history.

(56) References Cited

U.S. PATENT DOCUMENTS

| 2003/0229497 | A1 | 12/2003 | Wilson et al. | |
| 2004/0030541 | A1 | 2/2004 | Chou et al. | |
| 2007/0244702 | A1* | 10/2007 | Kahn et al. | 704/260 |
| 2008/0027726 | A1* | 1/2008 | Hansen et al. | 704/260 |

FOREIGN PATENT DOCUMENTS

| JP | 2004-240234 A | 8/2004 |
| KR | 10-2000-0074617 A | 12/2000 |

OTHER PUBLICATIONS

International Search Report and Written Opinion dated Dec. 13, 2011 for Int. Appl. No. PCT/US2011/03421, 9 pp.

* cited by examiner

*Primary Examiner* — Daniel D Abebe
(74) *Attorney, Agent, or Firm* — Perkins Coie LLP

(57) ABSTRACT

A method and apparatus useful to train speech recognition engines is provided. Many of today's speech recognition engines require training to particular individuals to accurately convert speech to text. The training requires the use of significant resources for certain applications. To alleviate the resources, a trainer is provided with the text transcription and the audio file. The trainer updates the text based on the audio file. The changes are provided to the speech recognition to train the recognition engine and update the user profile. In certain aspects, the training is reversible as it is possible to over train the system such that the trained system is actually less proficient.

10 Claims, 5 Drawing Sheets

METHODS AND SYSTEMS FOR TRAINING DICTATION-BASED SPEECH-TO-TEXT SYSTEMS USING RECORDED SAMPLES

CLAIM OF PRIORITY UNDER 35 U.S.C. §119

The present application claims the benefit of U.S. Provisional Patent Application Ser. No. 61/327,228, filed Apr. 23, 2010, which application is incorporated herein by reference as if set out in full.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to speech-to-text conversion for dictation systems, and more specifically, to methods and systems to train user profiles associated with speech recognition engines and test the trained profile to inhibit training a profile in a manner that may reduce accuracy.

2. Background

Many companies provide customers the ability to contact the company using a call center to field customer calls, correct customer problems, or direct the customer to the appropriate resource to solve the problems that initiated the call, real or imagined. Conventionally, a call center operates by a call being directed from a customer to an available agent or representative. Along with the telephone call, the agent or representative typically has a customer relation management screen that the company has authorized or specifically designed to facilitate assisting the customer.

Referring now to FIG. 1, a conceptual representation of the systems within a call center 100 is shown. The call center 100 includes both voice technologies which use the signaling and audio path and terminate at the agent's phone (or headset) and IP-based technologies that support the customer relationship management (CRM) application, whose graphical user interface (GUI) runs on the agent's processor, such as, for example, a personal computer or the like. To support this, the call center 100 includes, an automatic call distributor (ACD) 102 having an audio connection 104 to an agent phone 106. ACD 102 also has an audio connection 108 to an interactive voice response unit (IVR) 110. Audio connection 104 and 108 may be overlapping, completely separate, or a combination thereof. IVR 110 has a data connection 112 to CTI 114. Computer/Telephony Interface (CTI) 114 typically provides call control 116 to ACD 102 and data and application control 118 to an agent's computer 120. Thus, when a customer uses a telephone 122 or the like to call the call center over a conventional network 124, such as the public switch telephone network (PSTN) shown, the audio, data, and applications necessary for the agent to assist the caller are provided.

While FIG. 1 identifies a customer calling over a conventional PSTN as shown, calls from customers may originate from a computer or cable based voice over internet protocol (VoIP) network instead. The network 124 may be a conventional PSTN network as shown, such as, for example, when the customer is using a conventional landline or cellular telephone. Alternatively, network 124 may be a computing network, such as, for example, a LAN, a WAN, a WLAN, a WWAN, a WiFi, the internet, an Ethernet, or other private area network. When network 124 is a computing network, the call from the customer may originate from a VoIP enabled device, such as, for example, a computer telephone. Notice, VoIP telephones may be transferred to conventional PSTN networks using conventional technology. Moreover, conventional landlines, for example, may be connected to a computer network using a soft phone or media gateway.

Once the call between the customer service representative is established, and the CRM application is running on the representative's user interface, the customer service representative (CSR) would solicit input from the customer. Such input may consist of information such as, customer name, address, nature of the problem, and the like. Traditionally, the representative inputs this information by typing the information into the respective fields for input. At the end of the call, often the customer service representative would fill out a field in the CRM application generically known as notes or end of call notes. This field would typically be typed by the representative to acknowledge information such as, for example, the disposition of the customer complaint or the like.

To facilitate entering data into the CRM application, including entering data regarding the end of notes field, it may be possible to use a dictation system having a speech to text engine or speech recognition engine to allow the data to be dictated or captured during normal conversation/dialogue between the agent and the customer. See, for example, U.S. Pat. No. 7,702,093, issued Apr. 20, 2010, and incorporated herein by reference as if set out in full, and U.S. patent application Ser. No. 12/694,115, filed Jan. 26, 2010, and incorporated by reference as if set out in full. The audio signal would be directed to the speech recognition engine that would return textual data for input to the appropriate fields. Speech recognition engines may generally be classified as a natural language recognizer, such as DRAGON® NaturallySpeaking® currently available from Nuance Communications, Inc., or as a grammar-based or pattern matching recognizer, such as the Nuance Recognizer V9 also available from Nuance Communications, Inc.

Speech recognition engines, and in particular, natural language recognizers, may require training to function properly. Traditionally, training is accomplished by the user when the user edits the transcribed text. Thus, if the user speaks the word "potato" but the transcription returns the word "tomato," the user can correct the transcription and this correction is used to train the system. Ideally, once trained, the next time the user speaks the word "potato", the transcription would return the word "potato."

Using dictation as a tool to add information to fields in a CRM application, however, to date have been cumbersome and unwieldy. Speech recognition engines that require training to function properly are difficult and expensive as the customer representative must take valuable time to train the speech recognition engine such that it functions properly. Moreover, it has been discovered that in some cases, corrections to transcriptions when used to train the grammar based system, in fact, result in reduced accuracy of the overall system. Thus, against this background, it would be desirous to provide improved training and feedback for dictation based systems as well as testing for increased, or at least no decrease, in system accuracy based on the training.

SUMMARY

Embodiments disclosed herein address the above stated needs by providing scheduled training using actual audio samples and testing of trained speech recognition engines to determine whether the training increases or decreases accuracy.

DETAILED DESCRIPTION

The technology of the present application will now be explained with reference to a customer call center application. The technology, in general, is described as directing the audio from a user to a remote server that converts the audio to text and returns a transcription of the text. One of ordinary skill in the art on reading the disclosure will now recognize that the technology of the present application will be useful in other dictation systems that use training. For example, instead of a remote server to provide the transcription, the transcription may be loaded directly to the user processor. Additionally, the technology of the present application may be used in systems other than call centers to provide training for speech recognition engines relating to dictation systems. For example, both medical and legal services frequently use dictation systems. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As explained above, dictation based speech-to-text conversion software has existed for some time. The dictation may be performed on a local processor such that real-time or near real-time transcription of the dictation may be provided to the user. Instead of having the dictation performed on a local processor, it also is possible to stream the audio to a remote server that performs the dictation and returns textual data to the local processor. Alternatively, the dictation may be batch loaded to a central processor or server where the transcription is returned at a later date, returned shortly after the dictation, or stored for later retrieval. Either dictation system may use a speech recognition engine that is either a natural language recognizer, as a grammar-based or pattern matching recognizer, or a combination thereof. The technology of the present application, however, will be described in relation to natural language recognizer as they provide a more robust ability to generate data outside of a pattern match system.

Figure 1:
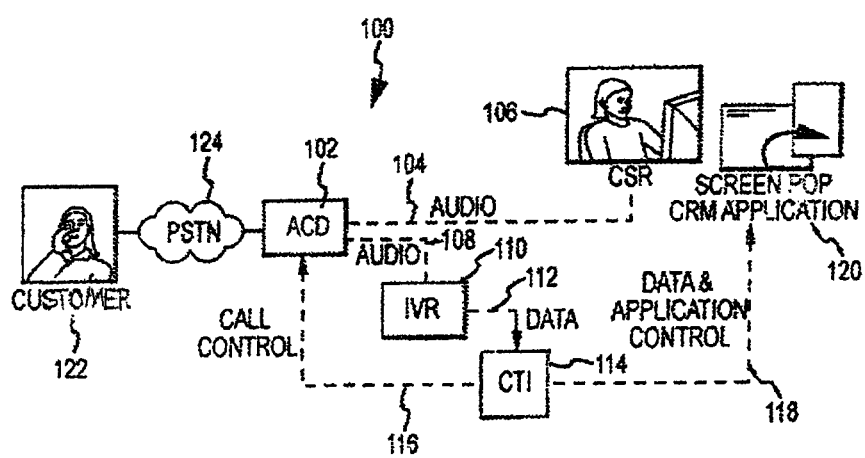
FIG. 1 is a functional block diagram of a call center system.
Figure 2:
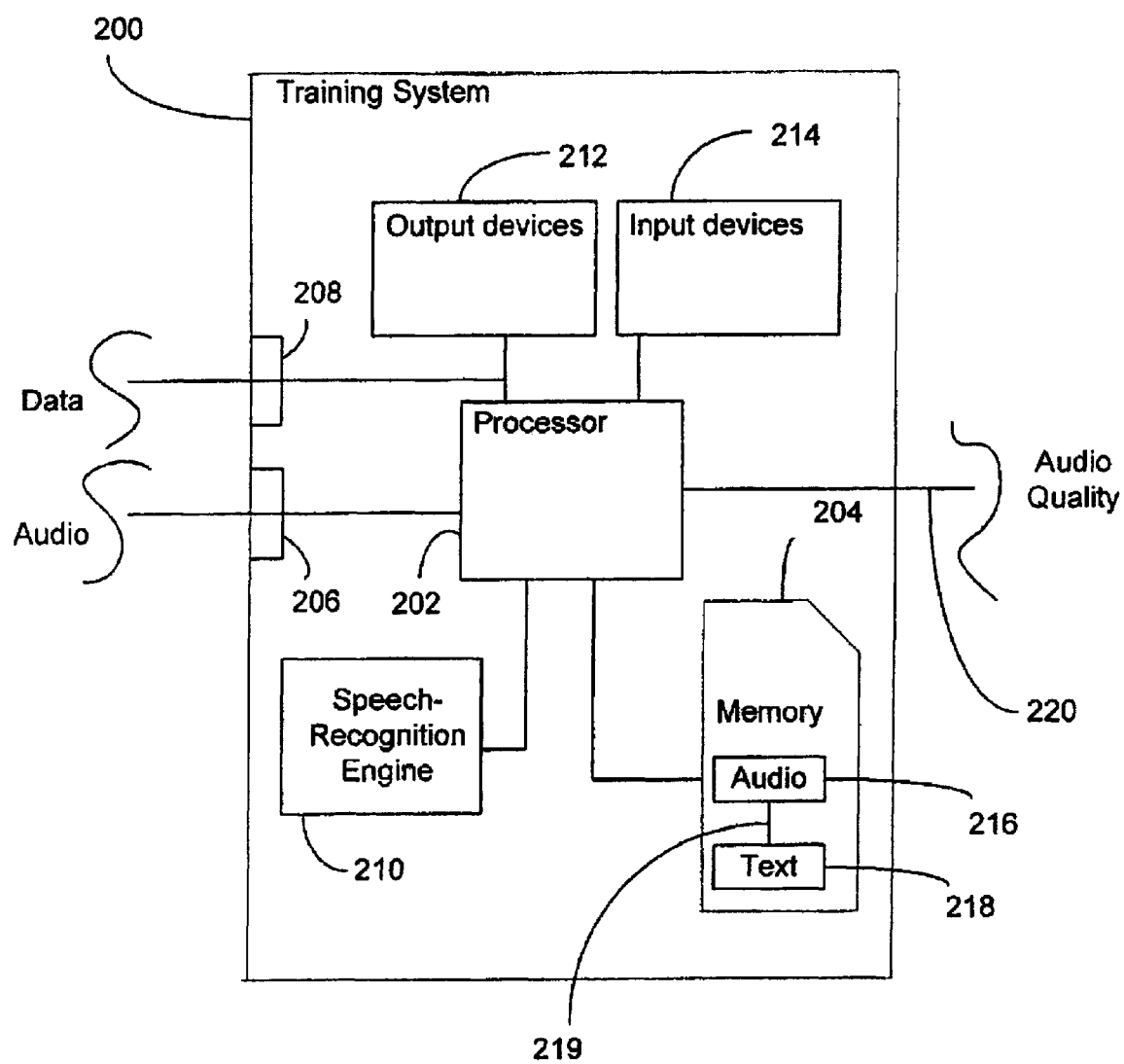
FIG. 2 is a functional block diagram of a training system consistent with an exemplary embodiment of the technology of the present application.

Referring first to FIG. 2, a functional diagram of a training system 200 for the technology of the present application is provided. Training system 200 includes a processor 202, such as, for example, a microprocessor, a central processing unit, a desktop computer, a server, a laptop computer, a handheld computer or the like. Processor 202 controls the major functions of the training system 200 including the functional operations described herein below. Processor 202 also processes the various inputs and/or data that may be required to operate training system 200. A memory 204 is interconnected with processor 202. Memory 204 may be remotely located or co-located with processor 202. The memory 204 also may store data necessary or convenient for operation of the training system 200 as will be explained herein. As will be explained, the memory 204 may include memory to store audio and text files to generate corrections and training material as will be explained further below. Training system 200 further includes an audio reception interface 206 or port that can receive or transmit audio information from and to a user, such as, for example, a customer service representative or transcription technician. Training system 200 also includes a data interface 208 or port to receive or transmit data from and to the user.

Interconnected to processor 202 is a speech recognition or speech-to-text engine 210 that converts the audio signal received from the user into a text file that can be returned to the user or further processed as part of the transcription. Speech recognition engine 210 is generally understood in the art and will not be further explained herein. Engine 210 may be provided remote from, integrated with, or co-located with processor 202.

Training system 200 further includes output devices 212, such as, a display, a printer, an email generator, or the like as is conventional in the art to output the results of the training system 200. To facilitate training of the speech recognition engine, as will be explained further below, output device 212 may comprise a speaker and a display. The speaker would play audio files, which audio files may be stored in memory 202, and the display would display the associated transcription or text file of the audio, which also may be stored in memory 202. Training system 200 may further comprise input devices 214. Input device 214 may include any conventional device, but will be described using reference to a conventional keyboard for convenience. Output device 212 and input devices 214 may be co-located or remote from training system 200. In such cases, the audio and text files may be transmitted to a remote location using a conventional or private network connection.

While shown and described as performing the transcription using speech recognition engine 210, training system 200 may receive a text file and audio file from a remotely located transcription engine or memory.

Figure 3:
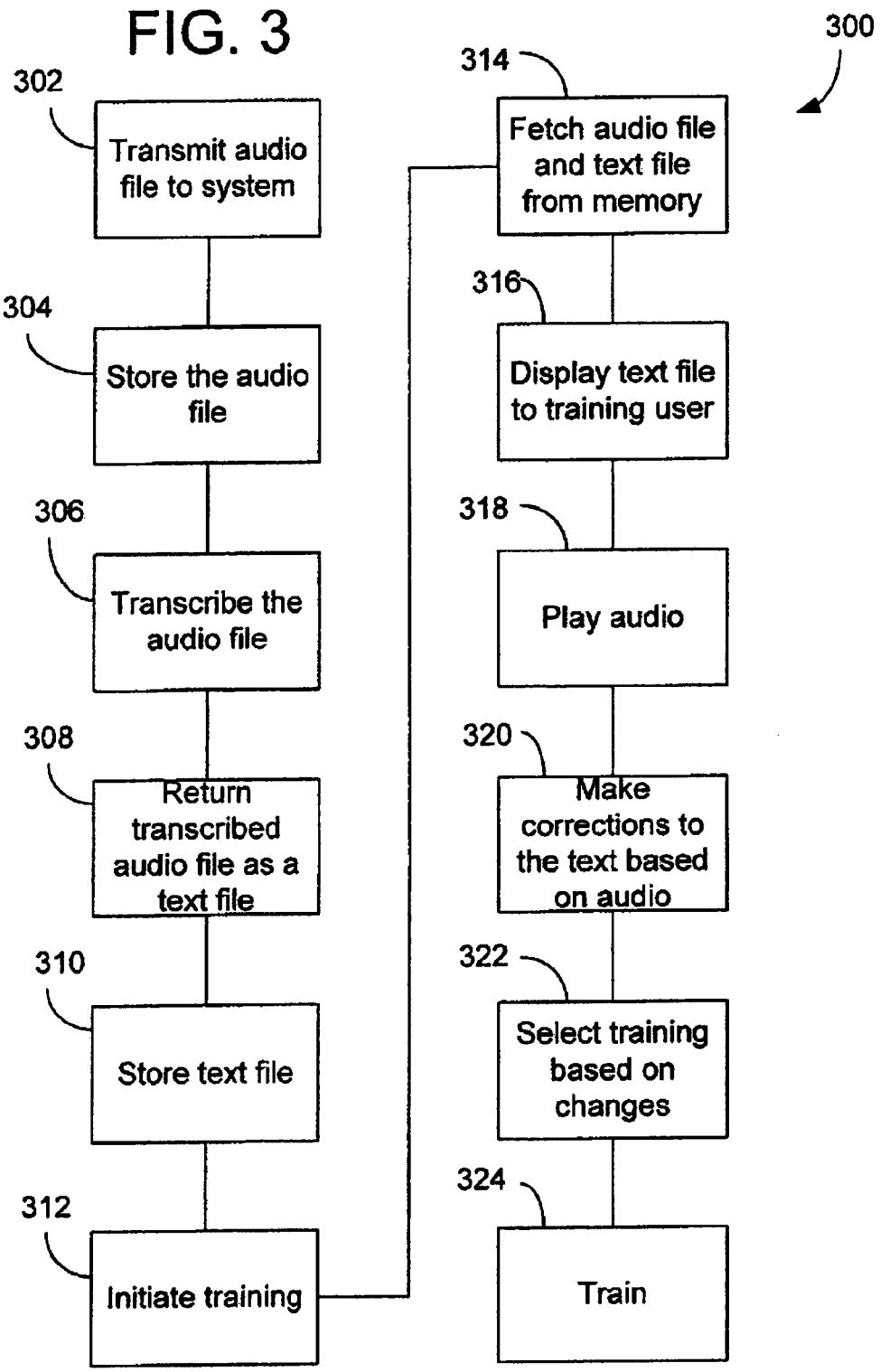
FIG. 3 is an exemplary operational flowchart illustrating an exemplary methodology associated with an embodiment of the technology of the present application.

Using dictation based systems for various industries, such as, for example, call center applications, medical dictation, legal dictation, and the like, requires that the transcription system be trained to recognize a user's dialectic; specialized words, clauses and phrases; and the like. Conventionally, training for these systems involve, for example, time that a customer service representative, doctor, lawyer, or the like may otherwise spend assisting customers, patients, or other clients. In order to improve efficiency, it would be desirable to provide alternative ways to train the speech recognition engine or speech-to-text engine 210. Referring now to FIG. 3, an exemplary flowchart 300 is provided showing exemplary operational steps to training a speech recognition engine where the customer service representative does not need to take time away from assisting customers.

Figure 4:
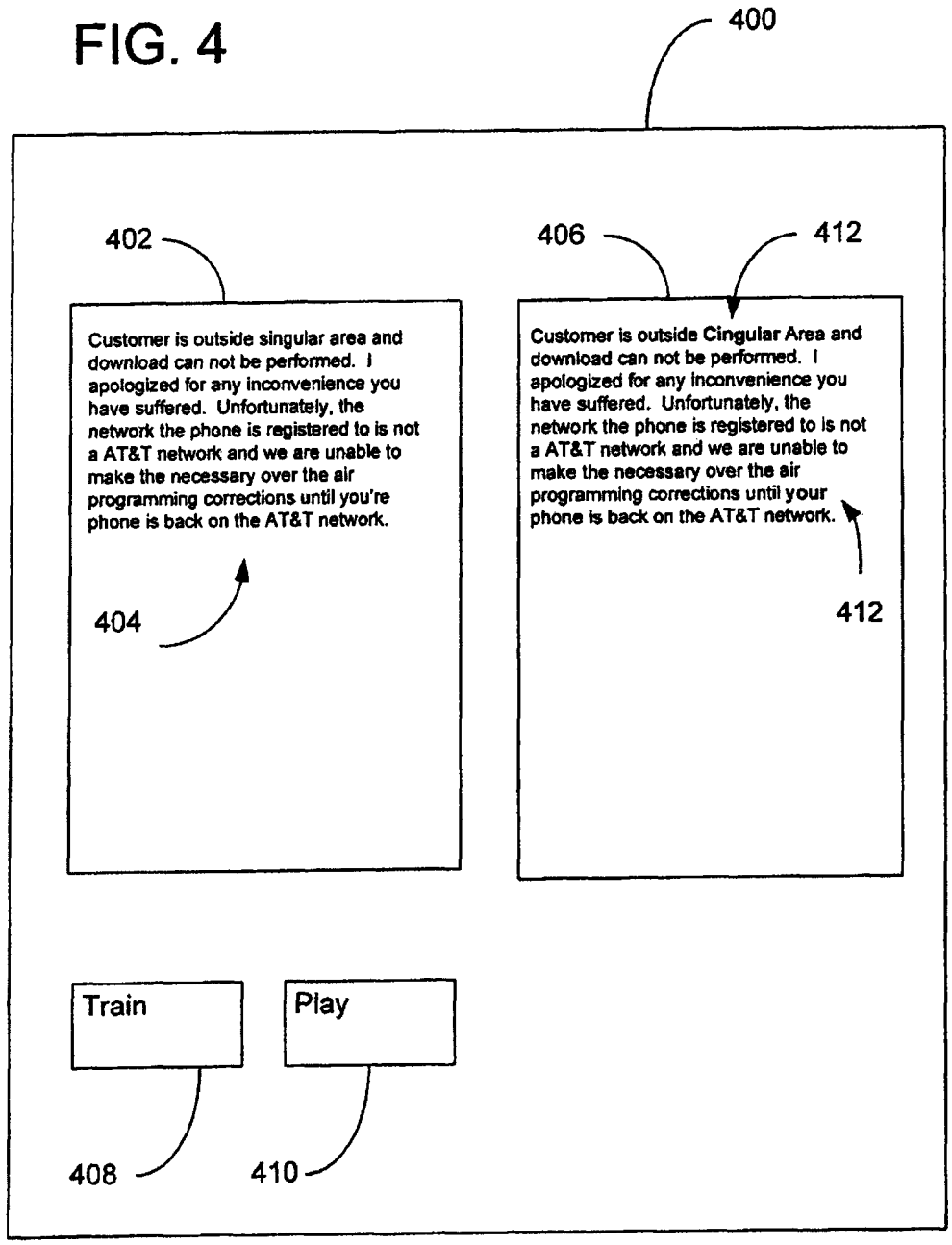
FIG. 4 is an exemplary display of a training screen associated with an exemplary embodiment of the technology of the present application.

It is assumed that an audio file 216 and a text file 218 of the transcribed audio are available in memory 204. However, if not, audio file 216 and text file 218 may be transmitted to training system 200, step 302. An audio file is stored in memory 204 as audio file 216, step 304. If the text file is not provided, speech recognition engine 210 transcribes the audio file, step 306. Speech recognition engine 210 may be co-located with training system 200, integrated with training system 200, or remote from training system 200 as a matter of design choice. Speech recognition engine 210 may transcribe the audio file substantially in real time or near real time, but real time or near real time transcription is not necessary. Once the transcription is complete, the text file is returned to the customer service representative, step 308, and stored in memory 204 as text file 218, step 310. If speech recognition engine is remote from training system 200, the text file is received by processor 202 via data port 208 and stored in memory 204. Audio file 216 and text file 218 may be associated via a link 219 or the like. Link 219 may include, for example, a hyperlink, a mapping, a correlation in a database, or the like. To train the speech recognition engine 210, a training user would initiate the training sequence, step 312. Processor 202 would fetch from memory 204 the audio file 216 and the associated or linked text file 218, step 314. The processor would display the text file 218 to the training user on, for example, a display 400 shown in FIG. 4, step 316. In this case, display 400 includes an original transcription text display 402. Processor 202 would substantially simultaneously, or on a prompt such as by clicking play icon 410, play audio file 216, step 318. The training user would make corrections either to the original transcription text display 402 or to a correction display 406 based on comparing the audio to the transcription text, step 320. In this case, changes are shown by corrections 412. Once the corrections are inputted, the training user would click the train icon 408 or the like, step 322, and speech recognition engine 210 would train based on the noted changes in a conventional fashion which will not be further explained herein, step 324.

The training of speech recognition engine 210 may occur substantially in real time after the training icon 408 is clicked. Alternatively, the training information may be stored in memory 204 or transmitted to a remote memory networked to training system 200 and/or speech-recognition engine 210 such that the training of speech recognition engine may be accomplished subsequently. In particular, the actual training of speech-recognition engine 210 may be delayed to process the training in a conventional manner at a time when the processor has more available resources. Thus, an administrator may schedule the training of speech-recognition engine 210 for particular users to occur at particular times, or the like when the speech-recognition engine is considered to be less "busy". Alternatively, the training system or the speech-recognition engine may monitor the speech-recognition engine for available capacity and automatically prompt training if certain predetermined conditions are satisfied, such as, for example, the processor load is below a certain percentage of capacity, the particular time (whatever that may be) is considered time when training is allowed, etc. For example, there may be times when processor load is estimated to be relatively high, but for one reason or another at any particular moment, the processor load is relatively low. Because demand on the processor may increase during these expected high load times, the training system would be prohibited from initiating training even if processor load happens to be low.

Figure 5:
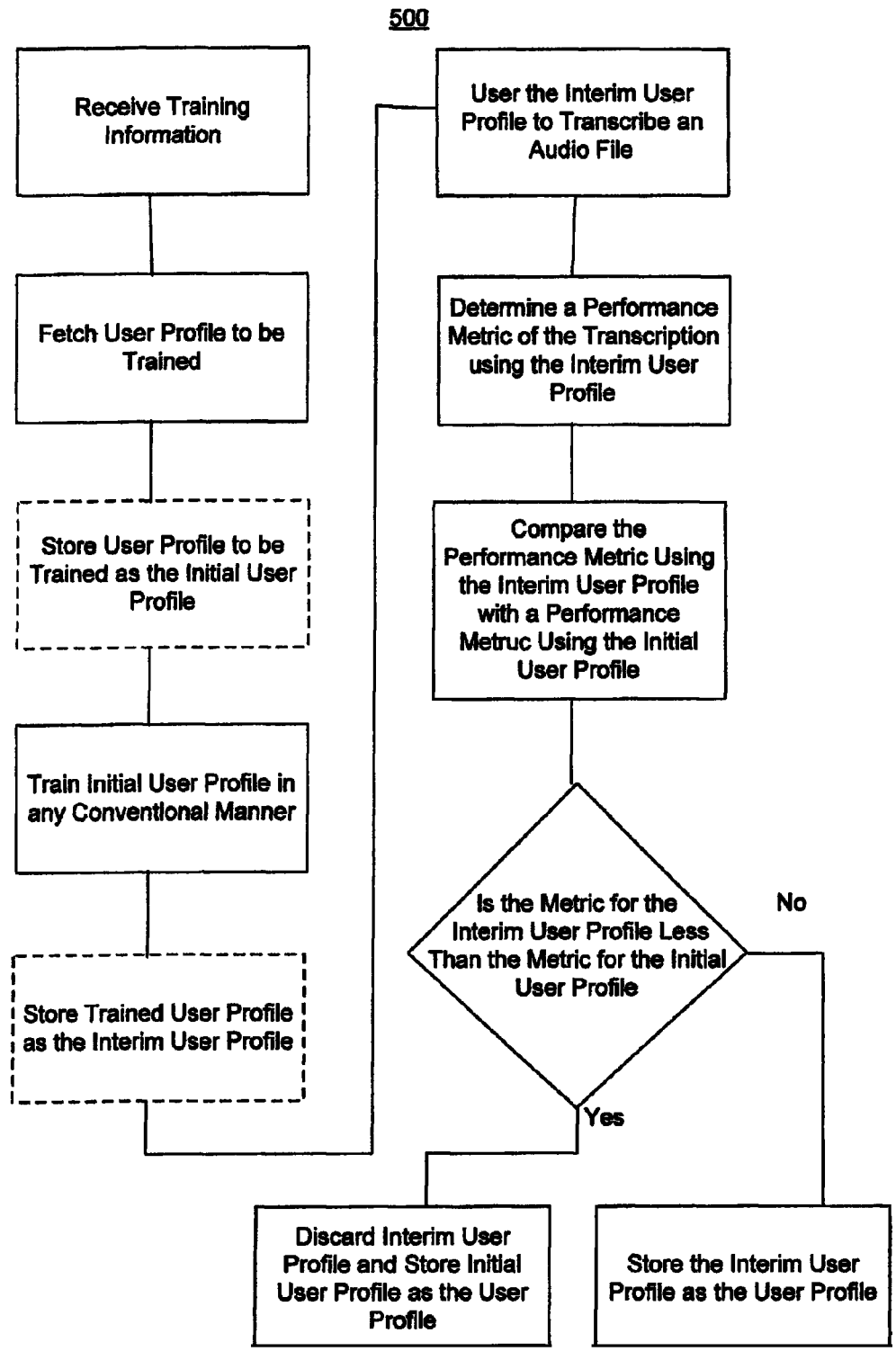
FIG. 5 is an exemplary operational flowchart illustrating an exemplary methodology associated with an embodiment of the technology of the present application.

As mentioned above, it has been discovered that in certain instances training of the speech-recognition engine decreases the accuracy of the engine such that the confidence of the transcription is diminished. Training is important to increase the accuracy and confidence associated with transcriptions. So training should be undertaken whenever warranted. However, it is not currently possible to predict whether any training of the speech recognition engine will result in increased confidence of the transcriptions, decreased accuracy of the transcriptions, or no change in the confidence of the transcriptions. Referring now to FIG. 5, an exemplary flowchart 500 is provided showing exemplary operational steps to training a user profile associated with a speech recognition engine where the trained user profile is tested for increased, or at least not decreased, confidence, accuracy, or other measure, prior to implementing the trained user profile. A customer service representative does not need to take time away from assisting customers. To initiate the process, the training system receives the training information, step 502. The training information may be from a pre-programmed training session, training information from step 324 of flowchart 300, or other applicable training information. The user profile to be trained is fetched from memory, step 504. The user profile to be trained is referred to below as the initial user profile. Optionally, the initial user profile prior to training is at least temporarily stored as the initial user profile in the memory, step 506. The initial user profile is trained using the received training information in a conventional manner, step 508, that will not be further explained herein, but such training is available via DRAGON® NATURALLYSPEAKING® from Nuance, Inc. The user profile after training, hereinafter the interim user profile, optionally is at least temporarily stored, step 510. Next, the interim user profile is used by the speech recognition engine to transcribe an audio file, step 512. The audio file may, for example, be the same audio file from which the training information was received. Alternatively, the audio file may be a customer test audio file, a previously transcribed audio file, or a new audio file. The accuracy of the transcription using the interim user profile is determined, step 514. Ideally, the audio file would be a known audio file such that the accuracy of the transcription using the interim user profile may be measured automatically. Notice, while accuracy is the performance metric called out herein, other performance metrics may be used. For example, the time delay between receiving the audio and returning a transcription may be used as a performance metric, average confidence of transcribed words may be used as a performance metric, etc. The accuracy of the interim user profile is compared to an accuracy of the initial user profile, step 516. For example, if the audio file from which the training information was provided is the audio file used for test purposes, the accuracy of the initial user profile can be determined as the accuracy was available via the corrections associated with flowchart 300. Alternatively, the initial user profile would be used to transcribe, for example, a customer test audio file, or the like. Next, it is determined if the accuracy of the interim user profile is less than the accuracy of the initial user profile, step 518. If it is determined that the accuracy of the interim user profile is less than the accuracy of the initial user profile, then the interim user profile is discarded and the initial user profile is stored as the user profile or the final user profile, step 520. Otherwise, the interim user profile, which is the trained profile, is stored as the user profile or the final user profile, step 522.

As can be appreciated, the above method and system provides a system for training where the customer service representative may continue to assist customers without the need to train the dictation system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for providing data to train a speech recognition engine performed on at least one processor, the method comprising:
   displaying to a trainer text from an audio file that has been transcribed by a speech recognition engine that is adapted to be trained and uses a user profile;
   playing to the trainer the audio file that was used by the speech recognition engine to generate the text being displayed;
   correcting the text on the display by the trainer based on discrepancies between the audio being played and the text being displayed; and
   transmitting the corrections to the speech to text engine to train the speech recognition engine to update the user profile,
   training the speech recognition engine based on the corrections, wherein training the speech recognition engine comprises:
   identifying a user profile of a user to be trained;
   designating the user profile as the initial user profile;
   saving the initial user profile;
   training the initial user profile as the interim user profile;
   using the interim user profile to transcribe an audio file of the user;
   determining a performance metric of the speech recognition engine using the interim user profile;
   comparing the performance metric using the interim user profile to a performance metric using the initial user profile;
   if the performance metric using the interim user profile is better than the performance metric using the initial user profile, replace the user profile with the interim user profile; and
   if the performance metric using the interim user profile is worse than the performance metric using the initial user profile, discard the interim user profile.

2. The method of claim 1 wherein the performance metric using the interim user profile is equal to the performance metric using the initial user profile, replace the user profile with the interim user profile.

3. The method of claim 1 wherein the performance metric using the interim user profile is equal to the performance metric using the initial user profile, discard the interim user profile.

4. The method of claim 1 wherein the performance metric is accuracy.

5. The method of claim 1 comprising obtaining a training audio file from the user and wherein the performance metric is based on generating text from the training audio file using the initial and interim user profile.

6. A method for training a speech recognition engine performed on at least one processor comprising:
   identifying a user profile of a user to be trained;
   designating the user profile as the initial user profile;
   receiving corrections to a text file to be used to train the user profile;
   saving the initial user profile;
   training the initial user profile and saving the trained initial user profile as the interim user profile;
   using the interim user profile to transcribe an audio file of the user;
   determining a performance metric of the speech recognition engine using the interim user profile;
   comparing the performance metric using the interim user profile to a performance metric using the initial user profile;
   if the performance metric using the interim user profile is better than the performance metric using the initial user profile, replace the user profile with the interim user profile; and
   if the performance metric using the interim user profile is worse than the performance metric using the initial user profile, discard the interim user profile.

7. The method of claim 6 wherein the performance metric using the interim user profile is equal to the performance metric using the initial user profile, replace the user profile with the interim user profile.

8. The method of claim 6 wherein the performance metric using the interim user profile is equal to the performance metric using the initial user profile, discard the interim user profile.

9. The method of claim 6 comprising obtaining a training audio file from the user and wherein the performance metric is based on generating text from the training audio file using the initial and interim user profile.

10. A non-transitory computer program product comprising at least one computer-readable medium comprising:

code for displaying to a trainer text from an audio file that has been transcribed by a speech recognition engine that is adapted to be trained and uses a user profile;

code for playing to the trainer the audio file that was used by the speech recognition engine to generate the text being displayed;

code for correcting the text on the display by the trainer based on discrepancies between the audio being played and the text being displayed;

code for transmitting the corrections to the speech to text engine to train the speech recognition engine and update the user profile;

code to identify a user profile of a user to be trained:

code to designate the user profile as the initial user profile;

code to save the initial user profile;

code to train the initial user profile as the interim user profile;

code to use the interim user profile to transcribe an audio file of the user;

code to determine a performance metric of the speech recognition engine using the interim user profile: and code to compare the performance metric using the interim user profile to a performance metric using the initial user profile such that if the performance metric using the interim user profile is better than the performance metric using the initial user profile, replace the user profile with the interim user profile, and if the performance metric using the interim user profile is worse than the performance metric using the initial user profile, discard the interim user profile.

\* \* \* \* \*

UNITED STATES PATENT AND TRADEMARK OFFICE
CERTIFICATE OF CORRECTION

| | | |
|---|---|---|
| PATENT NO. | : 8,744,848 B2 | Page 1 of 1 |
| APPLICATION NO. | : 13/091509 | |
| DATED | : June 3, 2014 | |
| INVENTOR(S) | : Jeffrey Hoepfinger and David Mondragon | |

It is certified that error appears in the above-identified patent and that said Letters Patent is hereby corrected as shown below:

On the Title Page, Item 73, in "Assignee," please delete "NVQQ Incorporated" and insert:

-- NVOQ Incorporated --

Signed and Sealed this
Seventeenth Day of March, 2015

Michelle K. Lee
*Director of the United States Patent and Trademark Office*